(No Model.) 2 Sheets—Sheet 1.
E. J. L. PERSIL.
VEHICLE WHEEL.
No. 500,293. Patented June 27, 1893.
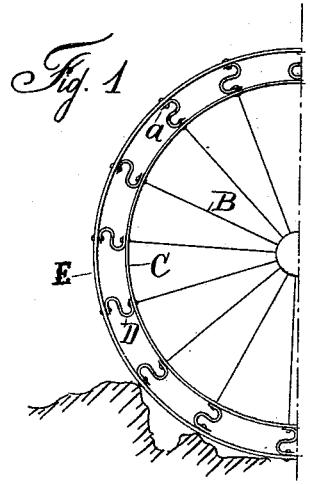
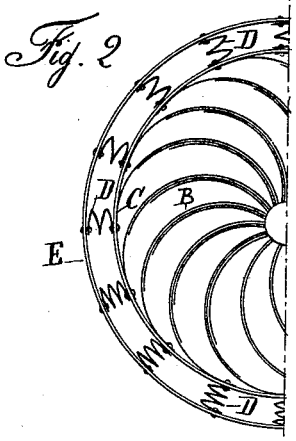
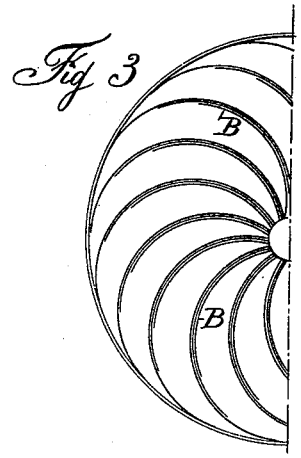
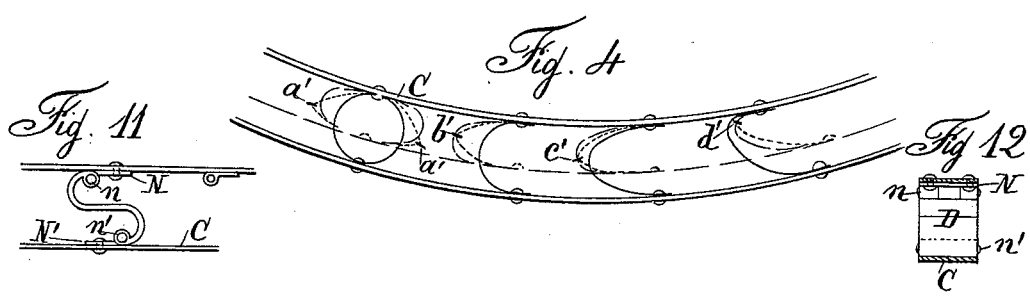
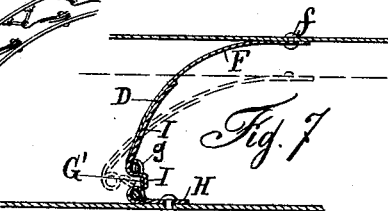
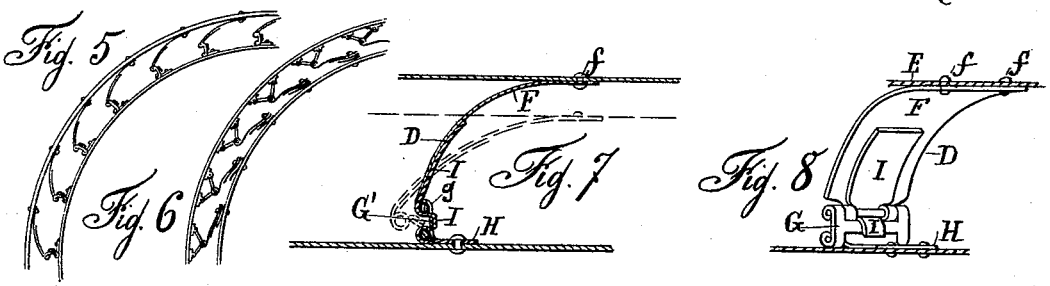
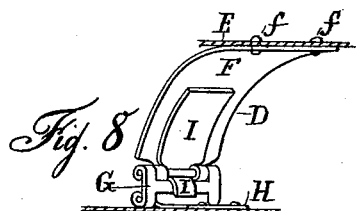
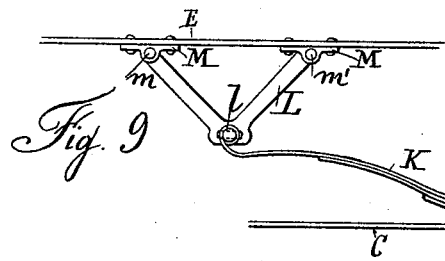
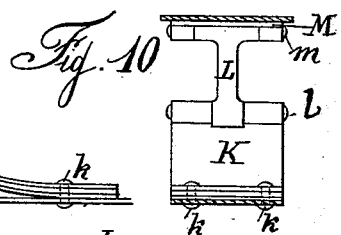
Witnesses:
Inventor:
Eugène Jean Léon Persil,
By his Attorney (No Model.) 2 Sheets—Sheet 2.

E. J. L. PERSIL.
VEHICLE WHEEL.

No. 500,293. Patented June 27, 1893.

Witnesses:

Inventor:
Eugène Jean Léon Persil,
By H. H. de Vos
Attorney.

UNITED STATES PATENT OFFICE.

EUGÈNE JEAN LEON PERSIL, OF PARIS, FRANCE.

VEHICLE-WHEEL.

SPECIFICATION forming part of Letters Patent No. 500,293, dated June 27, 1893.

Application filed March 15, 1892. Serial No. 424,962. (No model.) Patented in France July 15, 1891, No. 214,875.

*To all whom it may concern:*

Be it known that I, EUGÈNE JEAN LEON PERSIL, a citizen of the French Republic, residing at Paris, France, have invented certain new and useful Improvements in Wheels for all Kinds of Vehicles, (for which I have obtained Letters Patent in France, dated July 15, 1891, No. 214,875,) of which the following is a description.

The improved wheel, which forms the object of my invention, is based upon an entirely new principle and is adapted for all vehicles, but is designed, especially for bicycles, tricycles, &c. In action the wheel does away with all shaking, or jarring, makes very little noise and requires a smaller locomotive power than the ordinary wheel while at the same time it does not tire out the rider. Moreover the wheel is very light, and strong and can be manufactured at a low price.

In order to better explain the character of my invention, I will hereinafter describe in detail the several parts constituting the new wheel, reference to be had to the annexed drawings forming a part of this specification, in which—

Figure 13:
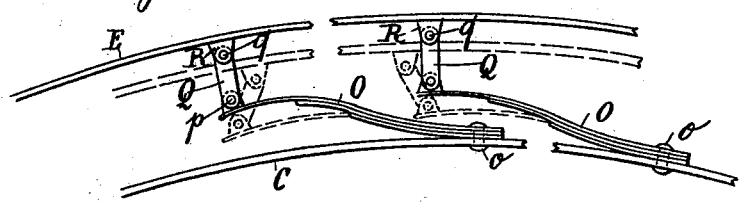
Figure 14:
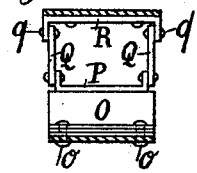
Figure 15:
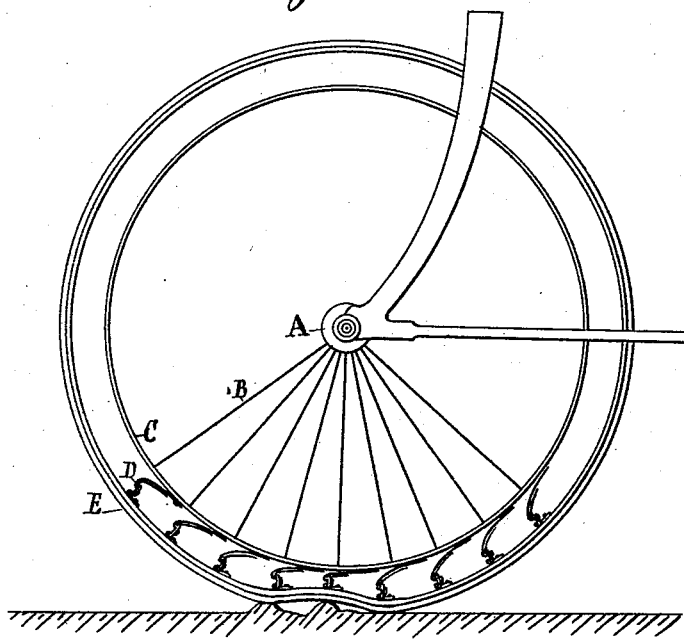

Figure 1 a side view of a portion of a wheel embodying my invention, the springs in this case being S shape and being riveted to place at each end. Fig. 2 is a similar view of a modified construction wherein the springs are in the form of the letter M. Fig. 3 represents a wheel wherein the spokes are formed from springs. Fig. 4 is a diagrammatical view, illustrating the points at which poorly formed springs are apt to break. Fig. 5 is a view of a portion of a compound felly wherein the springs are jointed. Fig. 6 is a similar view of a modified form of jointed spring. Fig. 7 is an enlarged sectional detail view of a jointed spring and its connections. Fig. 8 is a perspective view of the spring shown in Fig. 7. Fig. 9 is a side view of another style of jointed spring. Fig. 10 is an end view of the same, the compound felly being shown in section. Fig. 11 is a side view of a jointed S shaped spring. Fig. 12 is an end view of the same, the felly being shown in section. Fig. 13 is a side view of another form of jointed spring. Fig. 14 is an end view of the same, the felly being shown in section, and Fig. 15 is a view representing the wheel when in action.

A is a hub of any suitable size, in accordance with the vehicle for which the wheels are to be used.

B are the spokes connected to the hub and the inner felly.

C is a rigid inner felly made of metal or wood, as may be required, to which the spokes are connected and that carries a series of springs.

D represents the springs seated on the rigid inner felly C and connected with the flexible outer felly E.

E is the flexible outer felly made of one or more thin steel strips according to the circumstances and the weight of the vehicle to be supported, but so devised that it will momentarily yield when the wheel strikes an obstacle. This being explained and referring to Fig. 1, the function of the new wheel will be readily understood.

When an ordinary wheel with rigid felly strikes an obstacle it must either crush it or pass over it. In both cases a labor is performed at the expense of the velocity or of the locomotive power. For instance a velocipede running on a paved road, each time that the wheel passes from one stone to the other, it must be raised to the extent of the height of the stone and thereby lift its own weight and the weight of the rider. By multiplying the weight with the height and the velocity it will be easy to estimate the labor in kilogrammeters and if it is taken into consideration that this labor is repeated thousands of times on a long road, an idea is obtained of the labor thus lost, not to speak of the violent shaking which is highly prejudicial to the velocipede and very tiresome for the rider. A wheel constructed in accordance with the terms of my invention will on the contrary assume the form of the stone or other obstacle which it strikes, under the action of the springs which will momentarily yield and reassume their normal position as soon as the obstacle is overcome. In this manner all undue shaking or jarring will be avoided, while the expansion of the springs in the direction of the motion, will at the same time promote the propulsion, and thus materially decrease the amount of locomotive power required. It will now be understood that upon this principle flexible wheels of different form may be constructed, in accordance with the purpose for which they are to be used, not to speak of the form of the springs, which can be changed according to the different applications, the construction of the wheel itself can be greatly modified.

In the wheels with a double felly the springs are divided in two classes: first, the fixed springs (Figs. 1 and 2); second, the jointed springs (Figs. 5, 6, 7, 8, 9, 10, 11 and 12). The fixed springs are especially adapted for velocipedes and light carriages. The form of the springs should be so that while it is riveted on the two fellies, the metal is still allowed to extend. It is also desirable that the apothem passes through the center of the connecting points (see Fig. 1), so that the effect of the flexure will be always the same, whatever the position of the obstacle may be. According to this principle springs of different forms may be constructed. In the drawings I have illustrated some forms which I prefer in the construction of my wheel. Those shown in Fig. 1 are in the shape of the letter S and I make them generally of two superposed sheets. These sheets support each other and by their reciprocal action, detortion of the spring will be prevented.

Springs in the shape of a lying M, (Fig. 2) if necessary braced at the angles, may also be used.

The jointed springs are preferably used for heavy vehicles, in order that the ring of the springs should not become too high.

The springs may of course be constructed in other ways and I will now describe a few modified forms.

With the exception of the springs above described, any spring riveted at both ends, whatever its height or thickness may be, will be apt to loose its shape, and when allowed to expand, the metal will break. With such springs as those shown in Fig. 4 breaks are likely to occur at the points marked $a'$, $b'$, $c'$ and $d'$. However, to obtain the greatest elasticity, the connection must be rigid, as the slightest motion would absorb nine-tenths of the work of expansion and would cause a succession of resistances to the motion. In order to meet these objections I have devised strong, flexible springs of a slight height, which I will now proceed to describe. In these springs, although the connecting points to the fellies are rigid, the spring itself is free to expand and consequently it can be depressed and expanded in accordance with inflections of the felly.

As shown in Figs. 7 and 8 the jointed spring is composed of: first, a blade F riveted at one end to the outer felly at $f$ and jointed at $g$ to a support G which is again riveted with a plate H to the rigid felly, this construction allowing the spring to depress and expand without any prejudice to the metal; second, the spring proper I is composed of one or more blades, which being free can withstand the strongest compression and will expand afterward, without danger of becoming out of shape.

In Figs. 9 and 10 the jointed spring is essentially composed of: first, the spring proper K composed of one or more blades riveted at $k$ to the outer felly and swiveled at $l$ to the support L; second, a support L, the two arms of which are jointed at $m$, $m'$ to seats riveted to the flexible felly.

Figs. 11 and 12 show a side and front view of a jointed spring in S shape. At its two ends $n$, $n'$ the spring is jointed to seats N, N' riveted to the flexible and the interior felly. The S shaped spring could also be only jointed at the end toward the rigid felly.

Figs. 14 and 15 show another form jointed to the interior felly at $o$ and ending at the other end in a plate P provided with loops riveted to the upper blade of the spring. Two links Q are jointed at $p$ to the plate P and at $q$ to a second similar plate R riveted to the flexible felly.

In Fig. 15 is illustrated the action of the springs when the wheel strikes some obstacle and in Figs. 5 and 6 I have illustrated parts of a felly equipped with jointed springs.

Having now described my invention, I claim—

1. In a wheel the combination with an inner rigid felly and an outer yielding felly, of a series of S shaped springs that are arranged between the fellies.

2. In a wheel the combination with an inner rigid felly and an outer flexible felly of springs riveted to one of said fellies and supports on the other felly to which said springs are pivotally attached substantially as set forth.

In testimony that I claim the foregoing I have hereunto set my hand this 30th day of January, 1892.

EUGÈNE JEAN LEON PERSIL.

Witnesses:
VICTOR MATRAY,
JOSEPH SALING.